UNITED STATES PATENT OFFICE.

FREDERICK LAIST, OF ANACONDA, MONTANA.

PROCESS OF REDUCING CUPROUS CHLORID.

1,104,907. Specification of Letters Patent. Patented July 28, 1914.

No Drawing. Application filed April 30, 1914. Serial No. 835,338.

*To all whom it may concern:*

Be it known that I, FREDERICK LAIST, a citizen of the United States, residing at Anaconda, in the county of Deer Lodge and State of Montana, have invented certain new and useful Improvements in Processes of Reducing Cuprous Chlorid, of which the following is a specification.

My invention has relation to improvements in copper leaching processes, being particularly directed to the conversion into metallic copper, of the cuprous chlorid precipitated from solutions of oxidized copper ores as described in my U. S. Patent, Number 903,732, dated November 10, 1908.

The object of the present improvement is to subject the copper sub-chlorid or cuprous chlorid thus obtained to the action of reducing reagents in a suitable metallurgical furnace with a view not only of recovering the metallic copper, but with a view of regenerating the chlorid salt employed in the patent process for purposes of chloridizing the solution of oxidized copper from which the sub-chlorid is subsequently precipitated. The present improvement thus forms an extension of the patent process in that it supplies to said original process the soluble salts necessary to bring about the chloridization of the solution of the oxidized copper ores treated by said process.

The advantages of the improvement will be fully apparent from a detailed description thereof, which is as follows:

In the practice of my invention the precipitate of cuprous chlorid or sub-chlorid ($Cu_2Cl_2$) recovered under my patent process is collected on a vacuum filter (preferably) where it is washed with a little water, the washing process leaving the precipitate moist. The moist precipitate is then mixed with finely ground calcium carbonate ($CaCO_3$) preferably in the form of limestone, of which there is added about ten per cent. more than the theoretical quantity necessary to effect the desired reaction between the compounds, thereby insuring the presence of sufficient alkali to combine with the cuprous chlorid. With the calcium carbonate is added finely ground coal, coke, or other equivalent carbonaceous reducing reagent. The ingredients are thoroughly and intimately mixed and the resulting mass is preferably made into lumps of briquets by adding a suitable binder such as Portland cement, the binder being added in sufficient quantities (say about four per cent.) to bring about the desired result. The lumps are then placed in a suitable metallurgical furnace of the reverberatory or blast furnace type, and fused. The result of the fusion is a slag of calcium chlorid and a button of metallic copper as will be clear from the following reaction:

$Cu_2Cl_2 + CaCO_3 + C =$
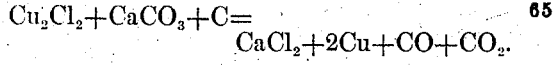
$CaCl_2 + 2Cu + CO + CO_2$.

This slag is then removed, and when cooled it is leached with water. The slag is composed principally of calcium chlorid and when leached with water supplies a strong solution of this salt for chloridizing the solution of the oxidized copper ores treated by my patent process aforesaid. In said process, it will be remembered, use is made of dilute sulfuric acid as the immediate solvent for the oxidized ores, sufficient chlorin (in the form of a soluble chlorid) being added to bring about the conversion of the soluble copper salts into the insoluble sub-chlorid, such conversion being effected, as a reference to the patent will show, in the presence of sulfur dioxid. The formation of the mass into lumps or briquets is of course not absolutely necessary, but is eminently desirable, because better handled for purposes of charging the same into the smelting furnace.

In lieu of limestone ($CaCO_3$) I may of course substitute a carbonate of an alkali, such as carbonate of sodium, in which event the slag resulting from the fusion with the cuprous chlorid would be sodium chlorid, the solution of which could be used as the chloridizing agent in connection with the sulfuric acid solvent under my patented process. Where carbonate of sodium is used the reaction of fusion would be substantially as follows:

$Cu_2Cl_2 + Na_2CO_3 + C =$
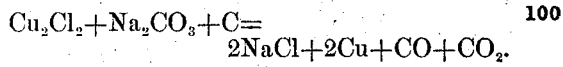
$2NaCl + 2Cu + CO + CO_2$.

I may in fact substitute for the calcium carbonate, the carbonate, oxid, or hydroxid of any of the alkaline earths, or their equivalents, or of the alkali metals or their equivalents, or mixtures thereof, without departing from the nature or spirit of my invention, the object sought being to produce, as a result of the fusion with the cuprous chlorid, a soluble chlorid for chloridizing the solution from which the copper is precipitated as $Cu_2Cl_2$ either under my original process as covered in my patent aforesaid, or in fact under any process where the regeneration of a chlorid is necessary or desirable. The chlorid thus regenerated (the soluble slag) is dissolved and subsequently employed for chloridizing fresh leaching solutions from which the dissolved copper compounds are precipitated in the form of cuprous chlorid.

Having described my invention, what I claim is:—

1. In the treatment of cuprous chlorid precipitated from solutions containing a soluble chlorid, the process of fusing said cuprous chlorid with a suitable reducing agent and with a metallic compound reacting therewith to form a chlorid slag corresponding in composition to the soluble chlorid aforesaid, and to reduce said cuprous chlorid to the metallic state.

2. In the treatment of cuprous chlorid precipitated from solutions containing a soluble chlorid, the process of fusing said cuprous chlorid with carbonaceous matter, and with a metallic compound reacting therewith to form a chlorid slag corresponding in composition to the soluble chlorid aforesaid, and to reduce said cuprous chlorid to the metallic state.

3. In the treatment of cuprous chlorid precipitated from leaching solutions containing chlorin, the process of fusing said cuprous chlorid with a suitable reducing agent, and with a metallic compound reacting therewith to extract the chlorin from said cuprous chlorid for use in subsequent leaching operations, and to reduce said cuprous chlorid to the metallic state.

4. In the treatment of cuprous chlorid precipitated from leaching solutions containing a soluble metallic chlorid, the process of fusing said cuprous chlorid with a suitable carbonaceous reagent, and with a metallic carbonate reacting therewith to combine with the chlorin of the cuprous chlorid and form a chlorid for use in subsequent leaching operations, and to reduce said cuprous chlorid to the metallic state.

5. In the treatment of cuprous chlorid precipitated from leaching solutions containing a soluble metallic chlorid, the process of fusing said cuprous chlorid with a suitable carbonaceous reagent, and with a carbonate of an alkaline earth whereby the soluble metallic chlorid is regenerated as a chlorid of the alkaline earth, and the cuprous chlorid is reduced to the metallic state.

6. In the treatment of cuprous chlorid precipitated from leaching solutions containing calcium chlorid, the process of mixing said precipitate with limestone in a finely divided state and in excess of the theoretical quantity necessary to effect the desired reaction, and with a suitable proportion of carbonaceous matter, subjecting the mixture to fusion, removing the resulting slag of calcium chlorid for use in subsequent leaching operations, and recovering the metallic copper resulting from the fusion aforesaid.

7. In the treatment of cuprous chlorid precipitated from leaching solutions coninting chlorin, the process of fusing said cuprous chlorid with carbonaceous matter, and with an oxygenated metallic compound reacting in the presence of the carbon to extract the chlorin from said cuprous chlorid for use in subsequent leaching operations, and to reduce said cuprous chlorid to the metallic state, and recovering the metallic copper resulting from said fusion.

In testimony whereof I affix my signature, in presence of two witnesses.

FREDERICK LAIST.

Witnesses:
Martin Martin,
William H. Sheerin.